United States Patent Office 3,560,568
Patented Feb. 2, 1971

3,560,568
PREPARATION OF SULFONIC ACID CONTAINING FLUOROCARBON VINYL ETHERS
Paul Raphael Resnick, Wilmington, Del., assignor to E. I. du Pont de Nemours and Company, Wilmington, Del.
No Drawing. Filed Nov. 26, 1968, Ser. No. 779,235
Int. Cl. C07c *143/16*
U.S. Cl. 260—513                                      1 Claim

ABSTRACT OF THE DISCLOSURE

Vinyl ethers of the formula $CF_2=CFOCF_2CFXSO_3Me$, wherein X is F or $CF_3$ and Me is alkali metal, are made by contacting and reacting an alkali metal alkoxide with a compound of the formula

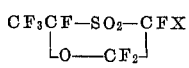

in an inert organic solvent. The vinyl ether reaction products can be copolymerized with fluorocarbon monomers, e.g., tetrafluoroethylene, to form ionically conductive material for use as fuel cell membranes.

---

This invention relates to a process for preparing certain sulfonyl-containing fluorocarbon vinyl ethers.

Sulfonyl-containing fluorocarbon vinyl ethers having the formula $FSO_2CFR_fCF_2O(CFXCF_2O)_nCF=CF_2$, wherein $R_f$ is F or perfluoroalkyl, X is F or $CF_3$, and $n$ is 0 to 12 are disclosed in U.S. Pat. No. 3,301,893 to Putnam et al. as being prepared by pyrolyzing the salt $FSO_2CFR_fCF_2O(CFXCF_2O)_nCFCF_3COONa$, wherein $R_f$, X and $n$ have the same meanings as indicated above.

It has now been discovered that certain sulfonyl-containing fluorocarbon vinyl ethers can be obtained by contacting and reacting an alkali metal alkoxide with a cyclic sulfone of the formula

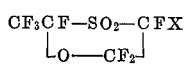

wherein X is F or $CF_3$, in an inert organic liquid which is a solvent for the sulfone. The resultant vinyl ether salts have the formula $CF_2=CFOCF_2CFXSO_3Me$, wherein X has the above-indicated meaning and Me is the alkali metal of the alkoxide.

The vinyl ether salts can be converted to the corresponding sulfonyl chloride (—$SO_2Cl$) by reaction with $PCl_5$, and in turn to the corresponding sulfonyl fluoride (—$SO_2F$) by reaction of the sulfonyl chloride with NaF. The vinyl ether salts can be converted to the corresponding sulfonic acid (—$SO_3H$) by reaction with a strong inorganic acid such as $H_2SO_4$. These vinyl ethers can be used in the same manner as the vinyl ethers disclosed in U.S. Pat. No. 3,282,875, to Connolly et al. As disclosed therein, the conversion reactions, i.e., salt to halide, acid, or other derivative, can be practiced on polymer containing repeat units derived from the vinyl ether. Copolymers containing the sulfonic acid form of the vinyl monomer prepared herein can be used as ionically conductive membranes in such applications as fuel cells and batteries as disclosed in U.S. patent application Ser. No. 639,515, filed May 18, 1967, by Wolfe and now abandoned.

The process of the present invention is conducted merely by adding the alkoxide and cyclic sulfone to the inert organic solvent in about equimolar quantities conveniently at ambient temperatures, but higher or lower temperatures such as from −20 to 200° C. can be used. The reaction can also be conducted at atmospheric pressure, although higher or lower pressures can be used.

The vinyl ether salt is recovered from the reaction medium by evaporation of the solvent.

Suitable solvents include those which are free of Zerewitinoff active hydrogen atoms. Thus, the solvent should also be anhydrous. Examples of suitable solvents include benzene and substituted benzene such as chlorobenzene, nitrobenzene, ethers such as diethyl ether and diphenyl ether, and cyclic ethers such as tetrahydrofuran. Sufficient solvent is used to dissolve the amount of sulfone reactant that is present.

The alkoxide reactant can be represented by the formula ROMe wherein Me is any alkali metal, preferably Na or K, and R is any hydrocarbon group which does not interfere with the reaction.

The alkoxide reactant need not be soluble in the particular solvent used. Examples of suitable alkoxides include sodium methoxide, potassium methoxide, cesium methoxide, lithium methoxide, rubidium methoxide, sodium ethoxide, potassium butoxide, and sodium phenoxide.

The cyclic sulfone reactant can be made by pyrolyzing at a temperature of from 200 to 600° C. in contact with a dry alkali metal salt such as $Na_2CO_3$, a compound of the formula $FSO_2CFXCF_2OCFCF_3COF$, wherein X if F or $CF_3$, which is disclosed in U.S. Pat. No. 3,301,893 to Putnam et al.

The following examples are intended to illustrate the present invention and not as a limitation on the scope thereof. Parts and percents are by weight unless otherwise indicated.

EXAMPLE 1

To a three-necked, two-liter flask fitted with a dropping funnel, mechanical stirrer, thermometer, still, receiver and Dry-Ice cooled trap is added 240 g. (2.25 mole) anhydrous $Na_2CO_3$ dried in a fluid bed under nitrogen. The entire apparatus is flamed out in a stream of dry nitrogen and the sodium carbonate in the flask heated to 300°. The flask is cooled and 750 ml. of anhydrous diethylene glycol diethyl ether (diglyme) is added through a silica gel column. 519 g. of

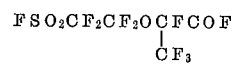

is added slowly, over a three-hour period, and the evolution of carbon dioxide is monitored with a bubble-flow indicator. The mixture is stirred until evolution of $CO_2$ stops and is then heated to remove the distillate boiling up to 80°. The material in the receiver and trap is greater than 99 percent cyclic sulfone of the formula

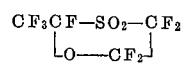

To a magnetically stirred 500 ml. three-necked flask, fitted with a water-cooled reflux condenser, pressure-equalizing dropping funnel and drying tube, is added 20.8 g. sodium methoxide (0.386 mole) and 300 g. of anhydrous ether. 112 g. (0.40 mole) of the cyclic sulfone prepared in the previous paragraph is added slowly through the dropping funnel and the mixture stirred at room temperature overnight. When the solution is clear, the ether is stripped off on a rotary evaporator and the remaining white salt having the formula $CF_2=CF_2OCF_2CF_2SO_3Na$ is dried in a vacuum oven at 60° for 24 hours.

A 350 ml. stainless steel cylinder is charged with 180 ml. of distilled water, 0.75 g. ammonium carbonate, 0.30 g. ammonium persulfate and 10 g. of the vinyl ether prepared in the previous paragraph. The mixture is heated to 70° and the cylinder pressured to 300 p.s.i. with tetrafluoroethylene. At the end of 5 hours the mixture is cooled and a white solid polymer recovered. The polymer is washed twice with water in a blender and dried in vacuum at 60°. The product, 19.3 g., has a M.P. 1–2° lower than that of polytetrafluoroethylene and its DTA shows the absence of some phase changes normally present in polytetrafluoroethylene. An IR spectrum of the copolymer shows the presence of bands due to the vinyl ether comonomer.

EXAMPLE 2

To a 200 ml. flask fitted with a magnetic stirrer and small still are added 30 g. of the vinyl ether of Example 1, and 42 g. phosphorous pentachloride. This is heated slowly and a colorless distillate (B.P. ca. 105°) of 28 ml. is obtained, which is a mixture of mainly $POCl_3$ and $CF_2{=}CFOCF_2CF_2SO_2Cl$.

A 200 ml. three-necked flask is fitted with a magnetic stirrer, thermometer, still and dropping funnel. The flask is charged with 50 g. of sodium fluoride and 50 g. of tetramethylene sulfone and heated to 100°. The crude $CF_2{=}CFOCF_2CF_2SO_2Cl$ product described above is added slowly and the material boiling at 70° collected. Gas chromatographic and IR analysis show the presence of a major proportion of this to be $CF_2{=}CFOCF_2CF_2SO_2F$. This is chlorinated in a sealed carius tube with chlorine to give $CF_2Cl \cdot CFClOCF_2CF_2SO_2F$, whose structure was consistent with the observed NMR, IR and mass spectral analyses.

As many apparently widely different embodiments of this invention may be made without departing from the spirit and scope thereof, it is to be understood that this invention is not limited to the specific embodiments thereof except as defined in the appended claim.

What is claimed is:

1. The process comprising contacting and reacting an alkali metal alkoxide with a compound of the formula

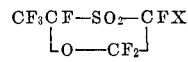

wherein X is F or $CF_3$ contained in an inert organic solvent and obtaining as a result thereof a compound of the formula $$CF_2{=}CFOCF_2CFXSO_3Me$$

wherein X has the same meaning as indicated above and Me is the alkali metal of the alkoxide.

References Cited
UNITED STATES PATENTS

| | | |
|---|---|---|
| 3,301,893 | 1/1967 | Putnam et al. |
| 3,402,197 | 9/1968 | Nychka. |
| 3,282,875 | 11/1966 | Connolly et al. |

DANIEL D. HORWITZ, Primary Examiner

U.S. Cl. X.R.

260—327; 136—146